United States Patent [19]

Wallner et al.

[11] 4,405,203

[45] Sep. 20, 1983

[54] ATMOSPHERIC DISPERSION CORRECTOR

[75] Inventors: Edward P. Wallner, Wayland; William B. Wetherell, Stoneham, both of Mass.

[73] Assignee: The United States of America as represented by the Secretary of the Air Force, Washington, D.C.

[21] Appl. No.: 195,147

[22] Filed: Oct. 8, 1980

[51] Int. Cl.³ .................... G02B 27/00; G02B 23/00
[52] U.S. Cl. .................................................. 350/168
[58] Field of Search ...................... 350/168, 421, 424

[56] References Cited

U.S. PATENT DOCUMENTS

| | | | |
|---|---|---|---|
| 2,305,776 | 12/1942 | Hansen | 350/286 |
| 2,443,258 | 6/1948 | Lindenblad . | |
| 2,763,177 | 8/1952 | Taylor | 350/421 |
| 2,824,972 | 4/1958 | Luboshez | 350/424 |
| 2,855,819 | 10/1958 | Luboshez | 350/421 |
| 3,477,788 | 11/1969 | Newcomer | 350/168 |
| 3,637,308 | 1/1972 | Van Raalte et al. | 350/421 |
| 3,900,263 | 8/1975 | Hall, Jr. | 350/168 |
| 4,059,343 | 11/1977 | Kowalski et al. | 350/421 |

OTHER PUBLICATIONS

Schott Optical Glass Inc., Catalog Optical Glass, No. 3050/USA.
Applied Optics, "Kitt Peak Speckle Camera", J. B. Breckenridge et al., Apr. 1979, vol. 18, No. 7, pp. 1034-1040.
Applied Optics, "Optical Refractive Index of Air: Dependence on Pressure, Temperature, and Composition," James C. Owens, Jan. 1967, vol. 6, No. 1.

Primary Examiner—John K. Corbin
Assistant Examiner—Paul M. Dzierzynski
Attorney, Agent, or Firm—Donald J. Singer; Jacob N. Erlich

[57] ABSTRACT

An atmospheric dispersion corrector having a housing capable of mounting therein either a pair of single prisms or a pair of compound prisms which can be either rotated with respect to each other or rotated, as a unit, simultaneously with each other. The specific requirements for the prisms making up both the pair of single prisms or the pair of compound prisms permit the corrector to rotate the single prisms or compound prisms through a particular rotation angle with respect to a vertical plane at which atmospheric dispersion correction over a broad spectral bandpass range can be achieved. These specific requirements encompass not only particular prism angles but also specific glass types from which the prisms are manufactured.

9 Claims, 7 Drawing Figures

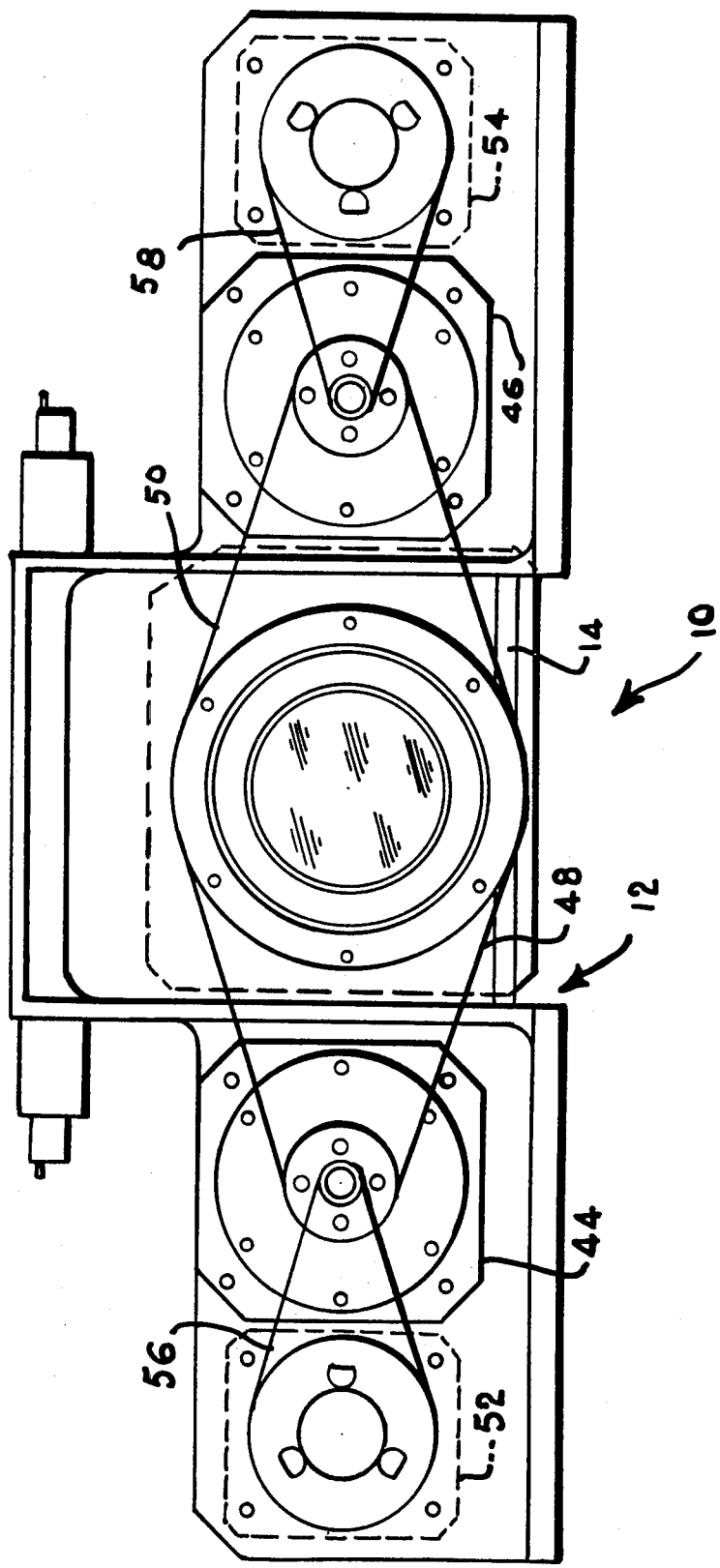

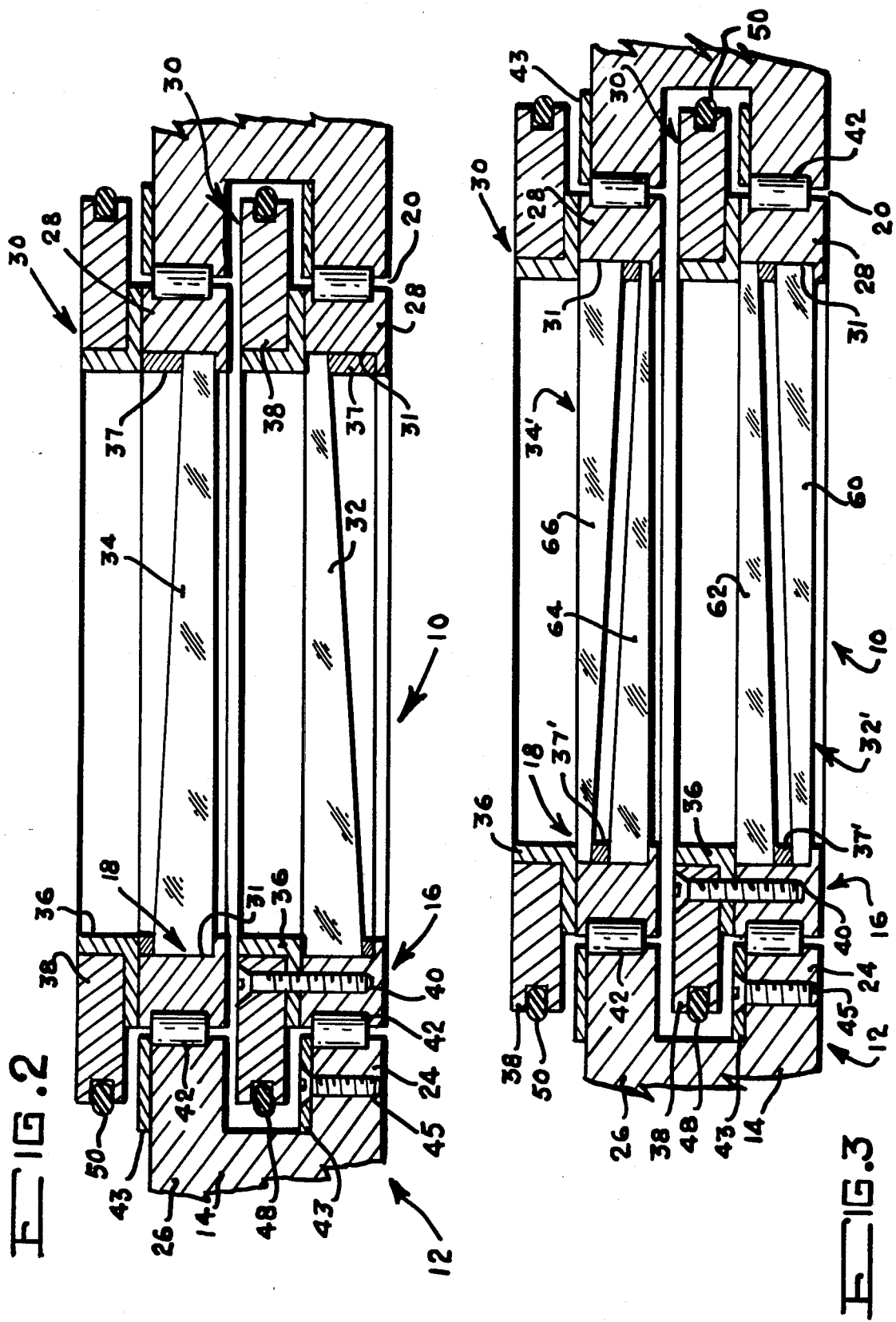

$\theta_1 = 2W_1 \cos \phi$

ATMOSPHERIC DISPERSION CORRECTOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to atmospheric dispersion correctors, and more particularly, to an atmospheric dispersion corrector which is capable of providing dispersion correction over a broad spectral bandpass range as well as being utilized with telescopes having large apertures.

The effects of chromatic dispersion in the atmosphere or atmospheric dispersion (which lead to lateral color in the images of objects away from the zenith) are well known to astronomical observers. In the past the effect of atmospheric turbulence has been the limiting factor on design considerations, of, for example, telescopes and other astronomical instruments. In instances where the effects of atmospheric dispersion exceeded the blur due to atmospheric turbulence, special prisms were utilized to obviate these effects for observations at large zenith angles. However, in the past, no greater accuracy has been required in correcting dispersion than to reduce it to the level of the effects of turbulence at practical zenith distances.

With the introduction of techniques for overcoming turbulence effects, such as real-time compensation using active optics and speckle imaging, dispersion must now be corrected much more precisely in order to maintain the quality of the image. The requirement to eliminate the effects of atmospheric dispersion grow even more stringent as the size of the telescope and the spectral band covered increase. Ideally, the residual dispersion errors should be small compared to the Airy disc of the telescope, therefore demanding greater precision as the size of the telescope is increased.

Unfortunately, atmospheric dispersion correctors of the past and of the type disclosed by J. B. Breckinridge et al. in the publication entitled "Kitt Peak Speckle Camera", Applied Optics, Vol. 18, No. 7, Apr. 1, 1979, pgs 1034–1041 have provided the correction for only a relatively narrow potential band. Since it is desirable not only to correct over a relatively narrow spectral band but also over the entire visible band and beyond, a need exists for the development of an atmospheric dispersion corrector which is capable of operating with large telescopes over a broad spectral band. A further motivation for the development of a broadband corrector is the desire to develop a single device that can be used satisfactorily with a wide selection of image sensors from film to infrared detectors.

SUMMARY OF THE INVENTION

The instant invention overcomes the problems encountered in the past by providing an atmospheric dispersion corrector which is applicable for use with telescopes having large apertures of, for example, up to 25 m in diameter and having a broad spectral bandpass of, for example, 350–1300 nm.

The instant invention not only provides an atmospheric dispersion corrector which provides broadband correction over the visible and near i.r. spectrum as well as giving small residual errors after correction but also provides a method for optimizing the design of such correctors as well as providing a method for the selection of appropriate glass types which will yield the above-mentioned desirable effects.

The atmospheric dispersion corrector of this invention is made up of a housing which is capable of mounting therein two glass prisms, rotatable with respect to each other as well as rotatable as a unit with respect to an object being viewed. For optimum results the housing is also capable of mounting therein two compound prisms, each compound prism being made of two components in the form of prisms of different glass types fixedly secured to each other. In this instance each compound prism is rotatable with respect to the other as well as both compound prisms being rotatable as a unit with respect to the viewed object.

In the design of the atmospheric dispersion corrector of this invention, it is necessary to introduce a predetermined total prism or wedge angle for the pair of prisms in order to provide dispersion correction over a broad spectral band. The optimum total prism angle is defined by the following equation:

$$\theta_{OPT} = m \tan(N'_A N'_P / N'_{P^2})$$

wherein the terms of the above equation are specifically defined in the detailed description of the invention set forth hereinbelow.

In selecting the optimum total prism or wedge angle for a component prism of the first glass type in the compound prism, the above equation is used with the effective refractivity given by the following equation:

$$N_P \lambda = [N_{P1} \lambda - K N_{P2} \lambda]$$

wherein the terms of the above equation are specifically defined in the detailed description of the invention set forth hereinbelow.

In addition, in order to select the proper glass types to be utilized for the compound prisms within the atmospheric dispersion corrector of this invention the following equation must be satisfied:

$$P_{xy2} = (\nu_{d2}/\nu_{d1})P_{xy1} - [(\nu_2/\nu_{d1}) - 1]P_{xyA}$$

wherein the terms of this equation are also specifically defined in the detailed description of the invention set forth hereinbelow.

It is therefore an object of this invention to provide an atmospheric dispersion corrector which is capable of providing broadband correction over the visible and near i.r. spectrum.

It is another object of this invention to provide an atmospheric dispersion corrector which is capable of being utilized with large aperture telescopes.

It is a further object of this invention to provide a method for optimizing the design of the atmospheric dispersion corrector of this invention.

It is still another object of this invention to provide a method of selecting glass types which can be utilized with the atmospheric dispersion corrector of this invention.

It is a still further object of this invention to provide an atmospheric dispersion corrector which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

FIG. 1 is an illustrative representation of the front view of the atmospheric dispersion corrector of this invention;

FIG. 2 is a side elevational view of the housing of the atmospheric dispersion corrector of this invention mounting therein a pair of prisms and shown partly in cross section;

FIG. 3 is a side elevational view of the housing of the atmospheric dispersion corrector of this invention mounting therein a pair of compound prisms and shown partly in cross section;

DETAILED DESCRIPTION OF THE PREFERRED EMBODIMENTS AND METHOD

Figure 4:
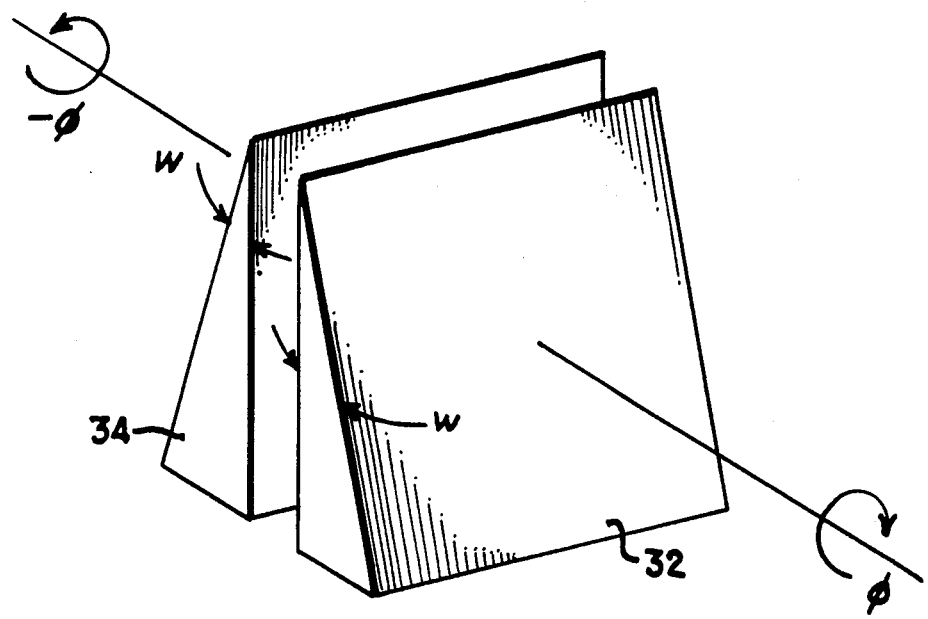
FIG. 4 is a pictorial schematic representation of the individual prisms utilized in the atmospheric dispersion corrector of this invention.

Reference is now made to FIG. 1 of the drawing which which provides an overall illustration of the atmospheric dispersion corrector 10 of this invention. Corrector 10 is made up of a housing 12 which includes therein a support 14. Rotatably mounted within support 14 are a pair of of prism holders 16 and 18 more clearly illustrated in FIGS. 2 and 3 of the drawing.

Reference is now made specifically to FIG. 2 of the drawing which clearly depicts support 14 and the pair of prism holders 16 and 18 rotatably mounted therein. Support 14 has a centrally located opening 20 which is defined by a pair of parallel circumferential outstanding support elements 24 and 26. Each prism holder 16 and 18 is made of identical elements; a prism support 28 and a drive assembly 30. For simplicity therefore, the following description will be made with respect to prism holder 16 but is applicable as well to prism holder 18 wherein like elements therein will be designated by the same numerals as set forth with respect to prism holder 16.

Prism support 28 is made of a cylindrical configuration having centrally located opening 31 therein. A suitable prism 32 and a suitable prism 34 fit within each prism support 28 of prism holders 16 and 18, respectively. Prisms 32 and 34 are identical and their specific angular requirements will be set forth in detail hereinbelow. Securing prism 32 (34) in place within support 28 is an annularly-shaped angle plate 36 which forms part of drive assembly 30 and an annular-shaped spacer element 37 of the appropriate axial dimension. Also forming part of drive assembly 30 is a pulley 38. Plate 36 and pulley 38 are fixedly secured to support 28 by any conventional securing means such as a plurality of bolts 40 (only one of which being shown in the drawing). Each prism support 28 of prism holders 16 and 18 is rotatably mounted within support elements 24 and 26, respectively, adjacent any suitable bearing members 42 which are held in place by any conventional cover plate 43. Any suitable securing means such as bolts 45 fasten cover plate 43 to outstanding element 24 and 26, respectively.

Referring once again to FIG. 1 of the drawing any suitable drive mechanism in the form of, for example, electric motors 44 and 46 are mounted on housing 12 of the atmospheric dispersion corrector 10 of this invention. Motors 44 and 46 are interconnected to pulley assemblies 30 of prism holders 16 and 18, respectively, by means of conventional pulley belts 48 and 50, respectively. Any conventional rotation sensors in the form of, for example, potentiometers 52 and 54 are in turn operably connected to motors 44 and 46, respectively. This connection can be accomplished by means of conventional belts 56 and 58. In this manner the amount of rotation of prism holders 16 and 18 can be ascertained. It should be also further noted that motors 44 and 46 may be operated either independently of each other or synchronously with each other in order to rotate prism holders 16 and 18 either independently of each other or in conjunction with each other as a single unit.

Reference is once again made to FIG. 2 of the drawing wherein the relationship between belts 48 and 50 and prism holders 16 and 18 is more clearly illustrated. Since pulley assembly 30 is fixedly secured to prism support 28, the rotation of belt 48 by motor 44 will cause the substantially simultaneous rotation of prism holder 16 while rotation of belt 50 by motor 46 will cause the substantially simultaneous rotation of prism holder 18. It should be noted, however, that although a specific design configuration is set forth hereinabove with respect to this invention, any other type of mounting arrangement which will allow for the individual rotation of prism holders 16 and 18 as well as the simultaneous rotation of prism holders 16 and 18 as a unit can be utilized within the scope of this invention.

Figure 5:
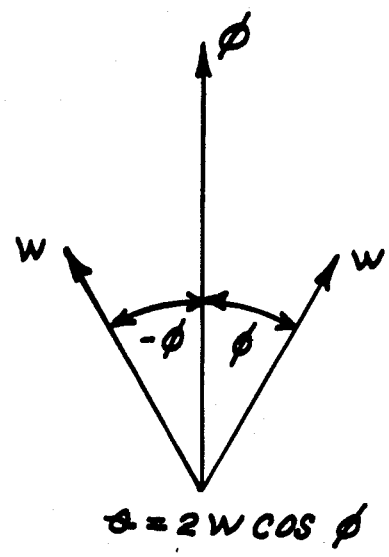
FIG. 5 is a vector diagram of the total prism or wedge angle of the individual prisms of the atmospheric dispersion corrector of this invention.

Referring to FIGS. 2, 4 and 5 of the drawing the rotation of prisms 32 and 34 (schematically illustrated in FIG. 4) with respect to each other by motors 44 and 46, respectively, will vary the total prism or wedge angle $\theta$ in accordance with the following equation:

$$\theta = 2w \cos \phi$$

where $w$ = Wedge or prism angle of each prism
$\phi$ = Prism angle of rotation of each prism with respect to the vertical plane containing the line of sight.

In order for the atmospheric dispersion corrector 10 of this invention to provide broadband utilization it is essential that corrector 10 match the variations of the index of refraction of air at all wavelengths. To do so utilizing available types of glass, the correction will be imperfect leaving residual errors. The effect of an error at a specific wavelength $\lambda$, will depend upon the response at that wavelength, which is in turn the product of the intensity of the object viewed $I(\lambda)$, the transmission of the atmosphere and optics $T(\lambda)$ and the response of the detector $\beta(\lambda)$. The normalized intensity weighted spectral average of a quantity will be indicated by an overbar, e.g.

$$\overline{N_A} = \int_0^\infty d\lambda I(\lambda) T(\lambda) \beta(\lambda) N_A(\lambda) / \int_0^\infty d\lambda I(\lambda) T(\lambda) \beta(\lambda)$$

where $N_A(\lambda)$ = Refractivity of atmosphere
  = $n_A(\lambda) - 1$
$n_A(\lambda)$ = Index of refraction of air The most useful measure of residual error is the mean square deviation from the mean angle. The optimum total prism or wedge angle $\theta_{OPT}$ which minimizes this residual error is:

$$\theta_{OPT} = m \tan \zeta \overline{N'_A N'_P} / \overline{N'_P{}^2} \qquad (3)$$

where
  m = Telescope magnification at corrector
  $\zeta$ = Zenith angle of ray outside of atmosphere
  $N'_A(\lambda) = N_A(\lambda) - \overline{N_A}$
  $N'_P(\lambda) = N_P(\lambda) - \overline{N_P}$
  $N_P(\lambda)$ = Refractivity of prism material.

In actuality, and as illustrated in FIG. 2 of the drawing, the prism unit is constructed of two prisms 32 and 34 which may be counter-rotated by motors 44 and 46 to vary the total prism angle $\theta$. Equation (3) describes the optimum total angle $\theta_{OPT}$ as a function of zenith angle. Since the refractivity of air is proportional to its pressure and inversely proportional to its absolute temperature, the term $\overline{N'_A N'_P}/\overline{N'_P{}^2}$ in equation (3) can be computed for standard conditions and scaled to give the optimum total prism angle $\theta_{OPT}$ for other conditions. The maximum zenith angle at which correction is to be made, $\zeta_{max}$, determines the maximum total prism angle $\theta$, which is twice the actual wedge or prism angle w of an individual prism.

It should be further noted that since the deviation angles are small, small angle approximations have been used in equation (3). For large magnifications, slight adjustments of the prisms or wedge angles w are made in the final design to account for finite prism angles.

In general the rays entering the prisms 32 and 34 will be deviated from their original direction. In many applications any such deviation by the prisms 32 and 34 is detrimental, leading to vignetting or more complex optics. In order to alleviate this problem, reference is now made to FIGS. 3, 6 and 7 of the drawing in which FIG. 3 is identical to FIG. 2 of the drawing except that prism holders 16 and 18 contain therein compound prisms 32' and 34'. Each compound prism 32' and 34', respectively, is made of a pair of components in the form of prisms 60 and 62 in holder 16 and prisms 64 and 66 in holder 18. As depicted in FIG. 3 the component prisms 60, 62 and 64, 66 of each compound prism 32' and 34' are fixedly positioned with respect to the other either by adding spacers 37' thereto or directly adhering the component prisms to each other. This securing is performed so that the apex edge 61 and 63 of each prism 60 and 62, respectively, is parallel to that of the other as indicated in FIG. 6 of the drawing.

By making each of the counter-rotating pair of prisms 32 and 34 (FIG. 2) in the form of compound prisms 32' and 34' (FIG. 3) of two components of different glass types another degree of freedom in the design (the ratio of the prism angles of the components) of the present invention is made available. This degree of freedom can be used to eliminate the mean deviation through the prism or to minimize further the residual error or to make some compromise between error and deviation. In most cases a zero deviation design is desired since it can be used more readily in an existing instrument. It should be further noted that although the glass types of each component prism of each compound prism 32' and 34' are different, it is preferred within the scope of this invention that the glass type of component prism 60 be identical to component 66 and the glass type of component prism 62 be identical to component prism 64.

Figure 6:
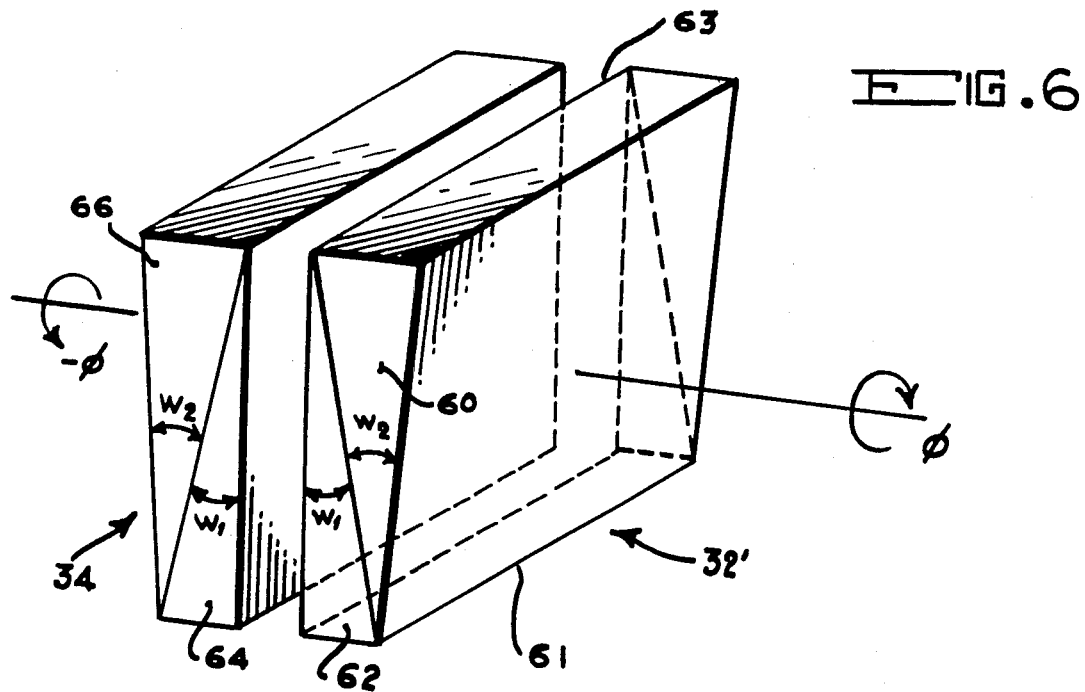
FIG. 6 is a pictorial schematic representation of the compound prisms utilized in the atmospheric dispersion corrector of this invention.
Figure 7:
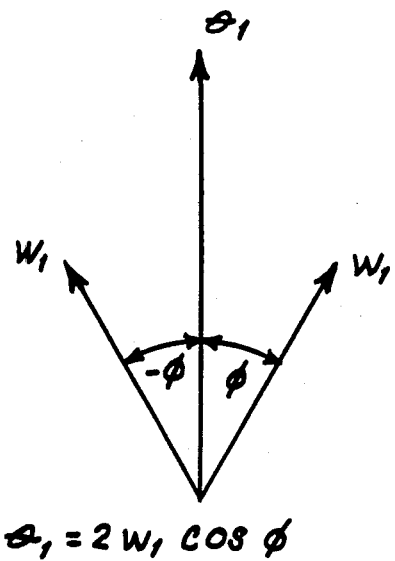
FIG. 7 is a vector diagram of the total prism or wedge angle of the first glass type of the compound prisms of the atmospheric dispersion corrector of this invention.

The prism angles and refractivities of the two glass component prisms 60 and 62 of compound prisms 32' (for example) are denoted by subscripts 1 and 2 as illustrated by the prism or wedge angles $w_1$ and $w_2$ of FIGS. 6 and 7. Since component prisms 64 and 66 will be identical to prisms 62 and 60, respectively, the above subscripts also refer thereto. For simplicity, however, the following description will refer to only prisms 60 and 62 of compound prism 32'. The deviation through the pair of compound prisms 32' and 34' is defined as follows:

$$\delta_p(\lambda) = \theta_1 [N_{P1}(\lambda) = K N_{P2}(\lambda)] \qquad (4)$$

where
  $\theta_1 = 2w_1 \cos \phi$
  $K = w_2/w_1$ (K is taken as positive when the two components are apex to base, and negative when they are apex to apex).

Equation (3) may be used for the compound prism 32' by using the bracketted term in equation (4) as its refractivity and solving for $\theta_1$.

To obtain a zero deviation prism, the ratio of prism angles should be set to $$K_o = \overline{N_{P1}}/\overline{N_{P2}} \qquad (5)$$

The technique outlined above for determining the optimum prism angles and the resulting performance requires only knowledge of the intensity distribution and the refractivities of air and the glasses used. The refractivity of air is modeled in detail in Owens, J. C., Appl. Opt., 6, 51 (1967). The refractivities of the glasses may be obtained from conventional glass catalogs such as "Catalog Optical Glass," Schott Optical Glass Inc., No. 3050/USA or from measured data on specific samples.

For the selection of glass types for compound prisms 32' and 34' the following analysis is set forth hereinbelow. For any two glasses with differing dispersions, a ratio of prism angles $w_2/w_1$ can be chosen to produce zero deviation at some selected wavelength and the angle $\theta_1$ can be chosen to correct the atmospheric dispersion between another pair of wavelengths.

If the wavelength for zero deviation is chosen as the d line (0.58756 $\mu$m), for which the index of refraction is given in the standard glass catalogs, the prism angles must satisfy equation (6)

$$N_{d1}w_1 - N_{d2}w_2 = (n_{d1}-1)w_1 - (n_{d2}-1)w_2 = 0 \qquad (6)$$

where
  $N_{d1}$ = Refractivity of glass 1 at the d line, etc.

If the two wavelengths at which the dispersion is to be corrected are chosen as the F (0.49613 $\mu$m) and C (0.65627 $\mu$m) lines, again so that catalog data may be used directly, then the prism angles $w_1$ and $w_2$ must satisfy equation (7)

$$(n_{F1} - n_{C1})w_1 - (n_{F2} - n_{C2})w_2 = m(\zeta_F - \zeta_C)/2 \qquad (7)$$
$$= m(n_{FA} - n_{CA})\tan\zeta_{max}/2$$

where $n_{FA}$ = Index of refraction of the atmosphere of the F line, etc.

The effective partial dispersion of a two component prism with zero deviation at the d line is given by equation (8)

$$P_{xy} = (\nu_{d2}P_{xy1} - \nu_{d1}P_{xy2})/(\nu_{d2} - \nu_{d1}) \quad (8)$$

where $P_{xy}$ = Partial dispersion between wavelengths x and y $$\nu_{d1} = (n_{d1} - 1)/(n_{F1} - n_{C1})$$
$$= \text{Abbe number of glass 1, etc.}$$

If the prism is to correct the partial dispersion of air between the x and y wavelengths as well as between the F and C wavelengths, the partial dispersions of the glasses must satisfy equation (9)

$$P_{xy2} = (\nu_{d2}/\nu_{d1})P_{xy1} - [(\nu_{d2}/\nu_{d1}) - 1]P_{xyA} \quad (9)$$

where $P_{xyA}$ = Partial dispersion of air at wavelength x and y and the value for air may be computed for any pair of wavelengths from the formulae in the Owen's article in Applied Optics cited hereinabove.

Glass types which satisfy equation (9) exactly or approximately for one or more pairs of wavelengths are suitable for use as correctors over the corresponding wavelength band, including the C and F lines. Using conventional refraction formulae, any set of wavelengths may be chosen in place of the d, F and C lines as well as for x and y if a particular spectral region is to be covered.

As an illustrative example of this invention, utilizing the method set forth hereinabove, glass types taken from the Schott catalog referenced hereinabove which would correct the F, C and t lines (0.48613, 0.165627 and 1.01398 μm) and also the i and g lines (0.36501 and 0.43584 μm) thus giving good correction over the entire visible and the near i.r. spectrum are set forth below:

LAKN14/K11
LAF24/KF9
LAF21/KF9
LASF6/BASF12
LASF5/BAF3.

In summary, for a given application, for the compound prism atmospheric dispersion corrector 10 of this invention a pair of glass types is found which provide good correction at a number of wavelengths distributed across the waveband of interest. The ratio K of the wedge angles $w_1$ and $w_2$ of the two glass types which results in no net deviation through the corrector 10 is then found. The maximum value of the angle $\theta_1$ is found for the extreme conditions under which the corrector 10 is to be used, i.e., for maximum zenith angle and atmospheric pressure and minimum temperature. The wedge angle $w_1$ of the first glass type is half of the maximum $\theta_1$ and the wedge angle $w_2$ is found from the specified ratio of wedge angles, K. The component prisms in each compound prism 32' and 34' are fixed with respect to one another and installed in the rotatable prism holder 16 and 18, respectively for use. The compound prisms 32' and 34' are rotated to orient the dispersion along the vertical and to maintain the angle $\theta_1$ at the optimum value as the zenith angle and atmospheric process and temperature change. Thus, the problem of atmospheric dispersion heretofore encountered is substantially eliminated.

Although this invention has been described with reference to particular embodiments, it will be understood to those skilled in the art that this invention is also capable of further and other embodiments within the spirit and scope of the appended claims.

We claim:

1. An atmospheric dispersion corrector capable of providing optimum correction over a preselected spectral band, said corrector comprising: a housing; a first simple prism; a second simple prism; said first prism and said second prism having identical prism angles w, wherein $w = m \tan \zeta_{max} \overline{N_{Amax}'N_P'}/2\overline{N_P'^2}$ and $m$ = the magnification at said corrector, $\zeta_{max}$ = the maximum zenith angle of a ray impinging on said corrector, the overbar (—) represents a normalized intensity weighted spectral average, $N_{Amax}'(\lambda) = N_{Amax}(\lambda) - \overline{N_{Amax}}$, $N_P'(\lambda) = N_P(\lambda) - \overline{N_P}$, $N_{Amax}(\lambda)$ = the refractivity of air at maximum pressure and minimum atmospheric temperature at which said corrector is to be used, $N_P(\lambda)$ = the refractivity of prism material at $\lambda$, and $\lambda$ = the wavelength of said ray; first means rotatably mounted within said housing for fixedly supporting said first prism therein; second means rotatably mounted within said housing for fixedly supporting said second prism therein adjacent to and in optical alignment with said first prism; and means operably connected to said first and said second rotatable prism supporting means for rotating said first and said second rotatable prism supporting means simultaneously with respect to each other as well as independently with respect to each other through an angle $2\phi_{OPT}$ in which $\phi_{OPT} = \cos^{-1}(\theta_{OPT}/2w)$ and wherein said optimum total prism angle $\theta_{OPT}$ is defined by the expression $\theta_{OPT} = m \tan \zeta \overline{N_A'N_P'}/\overline{N_P'^2}$ wherein $\zeta$ = the current zenith angle of a ray impinging on said corrector, $N_A'(\lambda) = N_A(\lambda) - \overline{N_A}$, and $\overline{N_A(\lambda)}$ = the refractivity of air at $\lambda$; whereby said corrector substantially eliminates the effects of atmospheric dispersion when said angle $2\phi_{OPT}$ is achieved.

2. An atmospheric dispersion corrector as defined in claim 1 wherein said prism rotating means comprises a first pulley secured to said first prism supporting means, a second pulley secured to said second prism supporting means, first means operably connected to said first pulley for rotating said first pulley and second means operably connected to said second pulley for rotating said second pulley.

3. An atmospheric dispersion corrector as defined in claim 2 further comprising first means operably connected to said first pulley rotating means for determining the amount of rotation of said first prism and second means operably connected to said second pulley rotating means for determining the amount of rotation of said second prism.

4. An atmospheric dispersion corrector as defined in claim 1 further comprising means operably connected to said prism rotating means for determining the amount of rotation of said first prism and said second prism.

5. An atmospheric dispersion corrector capable of providing optimum correction over a broad spectral band, said corrector comprising: a housing; a first compound prism, said first compound prism being made of a first component prism and a second component prism fixedly secured thereto; a second compound prism, said second compound prism being made of a first component prism and a second component prism fixedly secured thereto; said first component prism of both said first and said second compound prisms having identical prism angles $w_1$, said second component prism of both said first and said second compound prism having identical prism angles $w_2$; said first component prism of both said first and said second compound prism being made of a first predetermined glass type and said second component prism of both said first and said second compound prism being made of a second predetermined glass type, and said first and said second predetermined glass types are determined by satisfying the equation $P_{xy2}=(\nu_{d2}/\nu_{d1})P_{xy1}-((\nu_{d2}/\nu_{d1})-1)P_{xyA}$ where $P_{xy1}=$ the partial dispersion of said first glass type between one or more pairs of wavelengths x and y within a spectral band of interest, $\nu_{d1}=$ the Abbé number of said first glass type of its analog in the spectral band of interest, $P_{xy2}$ and $\nu_{d2}$ are the corresponding quantities for said second glass type and $P_{xyA}$ is the corresponding partial dispersion of air and wherein the ratio K of said prism angle $w_2$ of said second predetermined glass type to said prism angle $w_1$ of said first predetermined glass type is set to the value $\overline{N_{P1}}/\overline{N_{P2}}$; wherein $w_1 = m \tan \zeta_{max} \cdot \overline{N_{Amax}'N_P'}/2\overline{N_{P}'^2}$ and m=the magnification at said corrector, $\zeta_{max}=$ the maximum zenith angle of a ray impinging on said corrector, the overbar ($-$) represents a normalized intensity weighted spectral average, $N_{Amax}'(\lambda)=N_{Amax}(\lambda)-\overline{N_{Amax}}$, $N_{P}'(\lambda)=N_P(\lambda)-\overline{N_P}$, $N_{Amax}(\lambda)=$ the refractivity of air at maximum pressure and minimum atmospheric temperature at which said corrector is to be used, $N_P(\lambda)=N_{P1}(\lambda)-KN_{P2}(\lambda)$, $N_{P1}(\lambda)$ is the refractivity of said first component prism material at $\lambda$, $N_{P2}(\lambda)$ is the refractivity of said second component prism material at $\lambda$, K is the ratio of the prism angles $w_2/w_1$, and $\lambda=$ the wavelength of said ray; first means rotatably mounted within said housing for fixedly supporting said first compound prism therein; second means rotatably mounted within said housing for fixedly supporting said second compound prism therein adjacent to and in optical alignment with said first compound prism; and means operably connected to said first and said second rotatable compound prism supporting means for rotating said first and said second rotatable compound prism supporting means simultaneously with respect to each other as well as independently with respect to each other through an angle $2\phi_{OPT}$ where $\phi_{OPT}=\mathrm{Cos}^{-1}(\theta_{1OPT}/2w_1)$ and wherein said optimum total prism angle $\theta_{1OPT}$ of said first component of both said first and said second compound prisms is defined by the expression $\theta_{1OPT}=m\tan\zeta\overline{N_A'N_P'}/\overline{N_{P}'^2}$ wherein $\zeta=$ the zenith angle of a ray impinging on said corrector, $N_A'(\lambda)=N_A(\lambda)-\overline{N_A}$, $N_A(\lambda)=$ the refractivity of air at $\lambda$; whereby said corrector substantially eliminates the effects of atmospheric dispersion when said angle $2\phi_{OPT}$ is achieved.

6. An atmospheric dispersion corrector as defined in claim 5 wherein said prism rotating means comprises a first pulley secured to said first compound prism supporting means, a second pulley secured to said second compound prism supporting means, first means operably connected to said first pulley for rotating said first pulley and second means operably connected to said second pulley for rotating said second pulley.

7. An atmospheric dispersion corrector as defined in claim 6 further comprising first means operably connected to said first pulley rotating means for determining the amount of rotation of said first compound prism and second means operably connected to said second pulley rotating means for determining the amount of rotation of said second compound prism.

8. An atmospheric dispersion corrector as defined in claim 5 further comprising means operably connected to said prism rotating means for determining the amount of rotation of said first prism and said second prism.

9. A method of producing an optimally designed atmospheric dispersion corrector capable of providing optimum correction over a broad spectral band, comprising the steps of:

(a) selecting a first glass type and a second glass type, said glass types satisfying the equation $P_{xy2}=(\nu_{d2}/\nu_{d1})P_{xy1}-((\nu_{d2}/\nu_{d1})-1)P_{xyA}$ where $P_{xy1}=$ the partial dispersion of said first glass type between one or more pairs of wavelengths x and y within a spectral band of interest, $\nu_{d1}=$ the Abbe number of said first glass type or its analog in the spectral band of interest, $P_{xy2}$ and $\nu_{d2}$ are the corresponding quantities for said second glass type and $P_{xyA}$ is the corresponding partial dispersion of air;

(b) computing a ratio K, of prism angles for said first and said second glass types from the equation $K=\overline{N_{P1}}/\overline{N_{P2}}$ where the overbar ($-$) represents the normalized intensity weighted spectral average of a quantity, $N_{P1}(\lambda)=$refractivity of said first glass type, and $N_{P2}(\lambda)=$refractivity of said second glass type;

(c) making two prisms of said first glass type, each having a prism angle $w_1$ in which $w_1$ is defined by the following equation, $w_1 = m \tan \zeta_{max}\cdot\overline{N_{Amax}'N_P'}/2\overline{N_{P}'^2}$ where m=magnification at said corrector, $\zeta_{max}$ is the maximum zenith angle at which said corrector is to be used, $N_{Amax}'(\lambda)=N_{Amax}(\lambda)-\overline{N_{Amax}}$, $N_{Amax}(\lambda)=$refractivity of air at maximum atmospheric pressure and minimum atmospheric temperature at which said corrector is to be used, $N_P'(\lambda)=N_P(\lambda)-\overline{N_P}$, $N_P(\lambda)=(N_{P1}(\lambda)-KN_{P2}(\lambda))$;

(d) making two prisms of said second glass type each having a prism angle $w_2$ in which $w_2$ is defined by the equation $w_2=Kw_1$;

(e) forming a first and a second compound prism, each of said compound prisms being made by securing one of said prisms of said first glass type to one of said prisms of said second glass type with the apex edges of each prism of each compound prism being parallel;

(f) mounting said two compound prisms so that they may be rotated both with respect to each other as well as together with respect to a vertical plane containing a line of sight of each corrector; and (g) controlling the rotation angle $\phi$ of each of said compound prisms with respect to said vertical plane according to the equation $\phi=\cos^{-1}(-\theta_{1OPT}/2w_1)$ where $\theta_{1OPT}=m\tan\zeta\overline{N_A'N_P'}/\overline{N_{P}'^2}$, $\theta=$current zenith angle, $N_A(\lambda)=$refractivity of air for current conditions;

thereby substantially eliminating the effects of atmospheric dispersion over the spectral band of interest.

* * * * *